Patented Nov. 5, 1935

2,020,247

UNITED STATES PATENT OFFICE 2,020,247

CELLULOSE ACETATE COMPOSITION AND PLASTICIZER THEREFOR

Kenneth M. Irey, New Brunswick, N. J., assignor to Commercial Solvents Corporation, Terre Haute, Ind., a corporation of Maryland No Drawing. Application November 25, 1931,
Serial No. 577,383

4 Claims. (Cl. 134—26)

This invention relates to the production of films and lacquers from cellulose esters and pertains specifically to cellulose acetate compositions:

As is the case with cellulose ester lacquers in general, cellulose acetate lacquers consist essentially of a solution of cellulose acetate in suitable solvents to which is generally also added a hydrocarbon or other diluent to cheapen the mixture. Such films, however, are not generally satisfactory due principally to their poor adherence to surfaces and their inherent brittleness and consequent tendency to crack when subjected to bending. These defects are largely overcome by the incorporation in the lacquers of such materials as gums, resins, and plasticizers, gums and resins being incorporated chiefly for the purpose of promoting adherence of the film to the surface being coated and for increasing the body and sometimes the hardness of the film, while plasticizers are generally incorporated for the purpose of rendering the film plastic and impermeable.

The present invention is concerned principally with an improved type of plasticizing agent suitable for use in cellulose acetate products, and with the improved compositions thereby obtained. The requirements as to chemical and physical properties which cellulose acetate plasticizers should possess are in general as follows: They should have low vapor pressures at the temperature at which they are to be used. This is somewhat different from stating that they should have high boiling points, tho the latter is also a desirable property. They should possess stability under the conditions to which they are to be subjected. In general, they should have very low water solubility, altho in some cases this is not essential. It is preferable also that the material be a solvent for the cellulose acetate or else compatible with the latter in appreciable amounts.

It has now been discovered that a satisfactory cellulose acetate plasticizer may be obtained by the following procedure. A dihydric alcohol is first reacted with a polybasic acid or its anhydride. A part, but not all, of the carboxyl groups in the product thus obtained is then esterified in the presence of an esterification catalyst of the usual type, with a monohydric alcohol. The compound thus produced is further condensed by heating until only a relatively few carboxyl groups remain unreacted. It is believed that the product thus obtained is represented by the following equation:

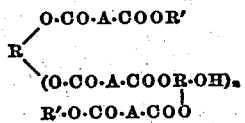

in which "R" represents the radicle of a dihydric alcohol, "R'" the radicle of a monohydric alcohol, "A" the radicle of a polybasic acid and "n" any number between one and four. By varying the proportion of the reactants and the method of procedure, the average value of "n" in the above formula may be changed, resulting, naturally, in a change in the properties of the product. The example given below will illustrate the preparation of a material of the type represented by the above formula. For convenience, in distinguishing this material from other materials obtainable from the same starting substances it will hereafter be referred to as "glycol butyl phthalate condensation product."

Example

One mol (62 grams) of glycol and 2.0 mols (268 grams) of phthalic anhydride are fused at 130–140° C. Heating is then continued at 160° C. until the reaction is complete (25–40 minutes). This stage of the operation is complete when a one gram sample titrated in neutralized acetone requires 5.6 c. c. N alkali to neutralize it. During the reaction which takes place at this point apparently one-half of the potential carboxyl groups of the phthalic anhydride are esterified with the glycol. To the product is next added 300 grams of normal butyl alcohol mixed with 22 grams of concentrated hydrochloric acid (sp. gr. 1.2) and the resulting liquid heated in a vessel provided with a fractionating column at a rate such that the liquid temperature rises to 125° C. in 1.10–1.25 hours. In this step apparently from one-half to two-thirds of the free carboxyl groups remaining after the first step of the operation are esterified with butyl alcohol. The completeness of the reaction at this stage is determined by titrating a sample as in the first stage. A one gram sample should require 2.4 c. c. N alkali to neutralize it. The product obtained by the above procedure containing free carboxyl and hydroxyl groups, is next mixed with an amount of glycol equal to half that originally used (31 grams) and the temperature gradually raised to 180° C. liquid temperature and held there for 10–12 hours. Then vacuum is applied and the heating continued at 180° C. until a one gram sample does not require more than 0.3 c. c. of N alkali to neutralize it. This will require 5–10 hours of heating. The final product usually contains appreciable quantities of dibutyl phthalate which may be removed, if desired.

Other similar compounds which may be obtained by slight modifications of the procedure just set forth are: glycol propyl phthalate condensation product, glycol benzyl phthalate condensation product, and similar compounds of other polybasic acids such as terephthalic acid, tartaric acid, citric acid, and the like. Other monohydric alcohols may also, of course, be substituted for those cited as examples. Examples of other suitable dihydric alcohols are: propylene glycol, butylene glycol, etc. Likewise, the proportions of reactants may vary from those of the specific example. For example, a suitable material may be prepared by reacting one mol of dihydric alcohol with 1.5 mols of phthalic anhydride and completing the reaction as in the example.

The compositions obtained as described above range in consistency from very viscous liquids to slightly deformable solids at ordinary room temperature, which also become viscous liquids when heated to a higher temperature. They have high molecular weights ranging between about 700 and about 2000 and are practically non-volatile at temperatures below 200° C. They are miscible with esters, ketones, and aromatic hydrocarbons and alcohols when mixed in equal proportions, and are soluble in all proportions in acetone and in mixtures of alcohols and any of the above mentioned solvents.

The condensation products of glycol esters of polybasic acids, such as glycol butyl phthalate condensation product give somewhat harder and tougher films with cellulose acetate than is the case with plasticizing agents previously regarded as the most satisfactory. This appears to be due to the fact that they function, when used with cellulose acetate, somewhat in the nature of gums.

The condensation products of glycol esters of polybasic acids, such as glycol butyl phthalate condensation product are compatible with cellulose acetate to the extent of 2 parts of the former to one of the latter, thus making it possible to obtain films of a rather wide degree of plasticity. In general, the amount of plasticizer may be varied from about 5% to 200% on the weight of the cellulose acetate used.

The following examples will illustrate methods of preparing cellulose acetate lacquers with condensation products of glycol esters of polybasic acids as plasticizing agents:

Example I

|  | Grams |
|---|---|
| Cellulose acetate (acetone soluble) | 5 |
| Glycol butyl phthalate condensation product | 10 | dissolved in 100 c. c. of a solvent consisting of:

|  | Percent |
|---|---|
| Acetone | 55 |
| Benzol | 30 |
| Diacetone alcohol | 15 |

Example II

|  | Grams |
|---|---|
| Cellulose acetate (acetate soluble) | 7 |
| Glycol benzyl phthalate condensation product | 7 | dissolved in 100 c. c. of a solvent consisting of:

|  | Percent |
|---|---|
| Acetone | 70 |
| Diacetone alcohol | 20 |
| Toluol | 10 |

Example III

|  | Grams |
|---|---|
| Cellulose acetate (acetone soluble) | 7 |
| Glycol propyl tartrate condensation product | 12 | dissolved in 100 c. c. of a solvent consisting of:

|  | Percent |
|---|---|
| Acetone | 50 |
| Diacetone alcohol | 15 |
| Toluol | 10 |
| Methyl ether of ethylene glycol | 25 |

If desired, pigments or dyes may also be included in the above composition, as for example, titanium dioxide, lithopone, zinc oxide, carbon black, Prussian blue, etc. In some cases also it may be desirable to include also resins or gums, as for example, polyvalent metallic salts of half esters of phthalic acid. In general, however, ordinary varnish gums are incompatible with cellulose acetate and cause fogged or cloudy films when incorporated with it.

Various other solvents may also be substituted for those used in the examples cited above such as: methyl acetate, methyl ethyl ketone, dimethyl cellosolve, ethylene chlorhydrin, ethyl lactate, cellosolve acetate, etc.

Xylol and alcohols such as ethanol, propanol, etc. are examples of other diluents which give satisfactory results.

What is claimed is:

1. A new composition of matter comprising cellulose acetate and a plasticizing agent comprising essentially a non-volatile material produced by the esterification of from 1.5 to 2.0 mols. of phthalic anhydride with approximately one mol of ethylene glycol, effecting substantial but not complete esterification of the resulting product with a monohydric alcohol, and further heating with additional glycol to effect condensation by reaction between the remaining free carboxyl and hydroxyl groups.

2. A new composition of matter comprising cellulose acetate and a plasticizing agent comprising essentially a non-volatile material produced by the esterification of from 1.5 to 2.0 mols of a polybasic acid with approximately one mol of ethylene glycol, effecting substantial but not complete esterification of the resulting product with butyl alcohol, and further heating with additional glycol to effect condensation by reaction between the remaining free carboxyl and hydroxyl groups.

3. A new composition of matter comprising cellulose acetate and a plasticizing agent comprising essentially a non-volatile material produced by the esterification of from 1.5 to 2.0 mols of phthalic anhydride with approximately one mol of ethylene glycol, effecting substantial but not complete esterification of the resulting product with butyl alcohol, and further heating with additional glycol to effect condensation by reaction between the remaining free carboxyl and hydroxyl groups.

4. A thin flexible sheet comprising cellulose acetate and a plasticizing agent comprising essentially a non-volatile material produced by the esterification of from 1.5 to 2.0 mols of phthalic anhydride with approximately one mol of ethylene glycol, effecting substantial but not complete esterification of the resulting product with butyl alcohol, and further heating with additional glycol to effect condensation by reaction between the remaining free carboxyl and hydroxyl groups.

KENNETH M. IREY.